(12) United States Patent  (10) Patent No.: US 8,041,484 B2
Imai et al.  (45) Date of Patent: Oct. 18, 2011

(54) ABNORMALITY REPORTING DEVICE FOR VEHICLE AND CONTROL PROGRAM

(75) Inventors: Hiroshi Imai, Tokyo (JP); Shigekazu Okuma, Tokyo (JP); Masahiro Matsuhashi, Akishima (JP)

(73) Assignees: Clarion Co., Ltd., Tokyo (JP); Tachi-S Co., Ltd., Tokyo (JP)

( * ) Notice: Subject to any disclaimer, the term of this patent is extended or adjusted under 35 U.S.C. 154(b) by 252 days.

(21) Appl. No.: 11/990,601

(22) PCT Filed: Jul. 19, 2006

(86) PCT No.: PCT/JP2006/314244
§ 371 (c)(1),
(2), (4) Date: Mar. 13, 2008

(87) PCT Pub. No.: WO2007/023624
PCT Pub. Date: Mar. 1, 2007

(65) Prior Publication Data
US 2009/0099721 A1  Apr. 16, 2009

(30) Foreign Application Priority Data
Aug. 22, 2005 (JP) ................................. 2005-240257

(51) Int. Cl.
*B60R 22/00* (2006.01)
*B60R 21/16* (2006.01)
*H03K 7/02* (2006.01)
*B60Q 1/00* (2006.01)

(52) U.S. Cl. ....... 701/46; 375/353; 340/438; 340/425.5; 280/734

(58) Field of Classification Search ..................... 701/29; 375/254, 278, 284, 285, 296, 346–352; 381/59, 381/85, 89, 332, 96, 111, 116, 117, 386, 381/24, 90, 300; 370/281, 302, 343, 330, 436, 478–481, 57, 69.1, 120, 114, 202, 533
See application file for complete search history.

(56) References Cited

U.S. PATENT DOCUMENTS
6,077,238 A * 6/2000 Chung .......................... 601/57
(Continued)

FOREIGN PATENT DOCUMENTS
JP  5330360  * 12/1993
(Continued)

OTHER PUBLICATIONS
International Search Report of the International Searching Authority mailed on Oct. 31, 2006 for the corresponding International patent application No. PCT/JP2006/314244.
(Continued)

*Primary Examiner* — James P Trammell
*Assistant Examiner* — Muhammad Shafi
(74) *Attorney, Agent, or Firm* — Posz Law Group, PLC (57) ABSTRACT

There are provided an abnormality reporting device that can generate vibration which can be easily perceived by a driver even when the driver is in a vibrating vehicle during running, and a control program therefore. The abnormality reporting device is equipped with a detector 2 for detecting the state of a driver 10 or the state of a vehicle 20 as a prescribed state when the vehicle 20 is moving, a judging unit 4 for judging on the basis of the detection result of the detector 2 whether it is under an abnormal state, and a vibrating unit 8 for applying vibration of a predetermined vibration pattern to the driver 10 when the abnormality state is judged, and the vibrating unit 8 can apply the vibration while varying the vibration pattern when the abnormality state is continued.

13 Claims, 7 Drawing Sheets

U.S. PATENT DOCUMENTS

| | | | |
|---|---|---|---|
| 2002/0004636 A1* | 1/2002 | Tsubata ........................ | 600/502 |
| 2003/0073886 A1 | 4/2003 | Yanagidaira et al. | |
| 2004/0260440 A1* | 12/2004 | Fujita et al. ..................... | 701/36 |

FOREIGN PATENT DOCUMENTS

| | | | |
|---|---|---|---|
| JP | A-5-330360 | | 12/1993 |
| JP | A-05-330360 | | 12/1993 |
| JP | A-6-64458 | | 3/1994 |
| JP | A-6-211067 | | 8/1994 |
| JP | 10291435 | * | 11/1998 |
| JP | A-10-291435 | | 11/1998 |
| JP | 11078591 | * | 3/1999 |
| JP | A-11-078591 | | 3/1999 |
| JP | A-11-78591 | | 3/1999 |
| JP | 2003016593 | * | 1/2003 |
| JP | A-2003-016593 | | 1/2003 |
| JP | A-2003-16593 | | 1/2003 |

OTHER PUBLICATIONS

Office Action issued on Oct. 26, 2009 from The Korean Patent Office for the corresponding Korean patent application No. 10-2008-7004128 (English translation enclosed).

Notification of $2^{nd}$ Office Action issued on Jan. 8, 2010 from the State Intellectual Property Office of the Peoples' Republic of China for the corresponding Chinese patent application No. 200680030593.X (English translation enclosed).

International Search Report of the International Searching Authority mailed on Mar. 6, 2008 for the corresponding International patent application No. PCT/JP2006/314244.

Office Action issued on Jun. 26, 2009 from The Patent Office of the People's Republic of China for the corresponding Chinese patent application No. 200680030593.X (English translation enclosed).

Office Action mailed Jan. 25, 2011 issued in corresponding JP patent application No. 2005-240257 (and English translation enclosed).

Decision of Rejection issued on Mar. 26, 2010 from the Korean Patent Office for the corresponding Korean patent application No. 10-2008-7004128 (English translation enclosed).

* cited by examiner

ABNORMALITY REPORTING DEVICE FOR VEHICLE AND CONTROL PROGRAM

TECHNICAL FIELD

The present invention relates to an abnormality reporting device for a vehicle that reports abnormality to a driver, and a control program.

BACKGROUND ART

There is known a vehicle abnormality reporting device in which a vibrating device (vibrating portion) is embedded in a driver's seat of a vehicle to report abnormality to a driver. As this type of device has been proposed in which, when it is detected that a driver falls into a drive dozing state, a vibrating device is actuated to generate vibration and this vibration shakes up the driver (for example, see Patent Document 1).
Patent Document 1: JP-A-5-330360

DISCLOSURE OF THE INVENTION

Problem to be Solved by the Invention

However, in the above conventional technique, the vibrating device applies continuous vibration to the driver, and thus there is a case where the driver in a vehicle, which is vibrated at all times during running, hardly perceives the vibration generated by the vibrating device.

The present invention has been implemented in view of the foregoing situation, and has an object to provide an abnormality reporting device for a vehicle with which abnormality can be surely reported to a driver even when the driver is in a vibrating vehicle during running, and a control program therefore.

Means of Solving the Problem

In order to attain the above object, the present invention is characterized by comprising a detector for detecting the state of a driver or the running state of a vehicle while the vehicle is running, a judging unit for judging on the basis of a detection result of the detector whether the state of the driver or the state of the vehicle is under an abnormal state, and a vibrating unit for applying vibration having a predetermined vibration pattern to the driver when the abnormal state is judged, wherein the vibrating unit applies the vibration while varying the vibration pattern when the abnormal state is continued.

Furthermore, in the above invention, the vibrating unit continuously varies the frequency of the vibration when the vibration pattern is varied.

In the above invention, the vibrating unit continuously or stepwise varies the amplitude of the vibration when the vibration pattern is varied.

In the above invention, the vibrating unit varies the vibration applying interval when the vibration pattern is varied.

In the above invention, the vibration obtained by the vibration pattern is a one-shot vibration.

In the above invention, the judging unit judges the abnormal state when the detection result of the detector indicates that the driver is under a nap state.

In the above invention, the judging unit judges the abnormal state when the detection result of the detector indicates that the vehicle deviates from a white line.

In the above invention, the vibrating unit is disposed at a seat in which the driver sits.

In the above invention, the vibrating unit is equipped with a speaker for converting an electrical signal to the vibration.

The above invention is further equipped with a vehicle speed detector for detecting the speed of the vehicle, and the vibrating unit varies the vibration pattern in accordance with the detected speed.

In the above invention, when the vibration pattern is varied, the vibrating unit lengthens an initial driving interval if the detected speed is low, and shortens the initial driving interval if the detected speed is high.

In the above invention, the vibrating unit varies initial vibration intensity in accordance with the detected speed when the vibration pattern is varied.

In order to attain the above object, according to the invention, a control program for controlling a vehicle abnormality reporting device having a detector for detecting the state of a driver or the running state of a vehicle during running of the vehicle and a vibrating unit for applying vibration of a predetermined vibration pattern to the driver under the control of a computer is characterized in that the control program makes the detector detect the state of the driver or the running state of the vehicle and judge on the basis of the detection result whether the state of the driver or the state of the vehicle is under an abnormal state, and makes the vibrating unit vibrate in a predetermined vibration pattern when the abnormal state is judged and makes the vibrating unit apply vibration while the vibration pattern is varied when the abnormal state is continued.

Effect of the Invention

According to the present invention, even when the driver is in the vibrating vehicle during running, vibration which is easily perceived by the driver is generated, and thus abnormality can be surely reported to the driver.

DESCRIPTION OF REFERENCE NUMERALS 1 driving seat (seat)
2 heartbeat sensor
4 judging device (judging unit)
8 vibrating device (vibrating unit)
10 driver
11 vehicle speed sensor (vehicle speed detector)
12 vehicle speed detecting circuit
20 vehicle
22 white line
100 vehicle abnormality reporting device SP speaker

BEST MODE FOR CARRYING OUT THE INVENTION

An embodiment according to the present invention will be described hereunder with reference to the accompanying drawings.

Figure 1:
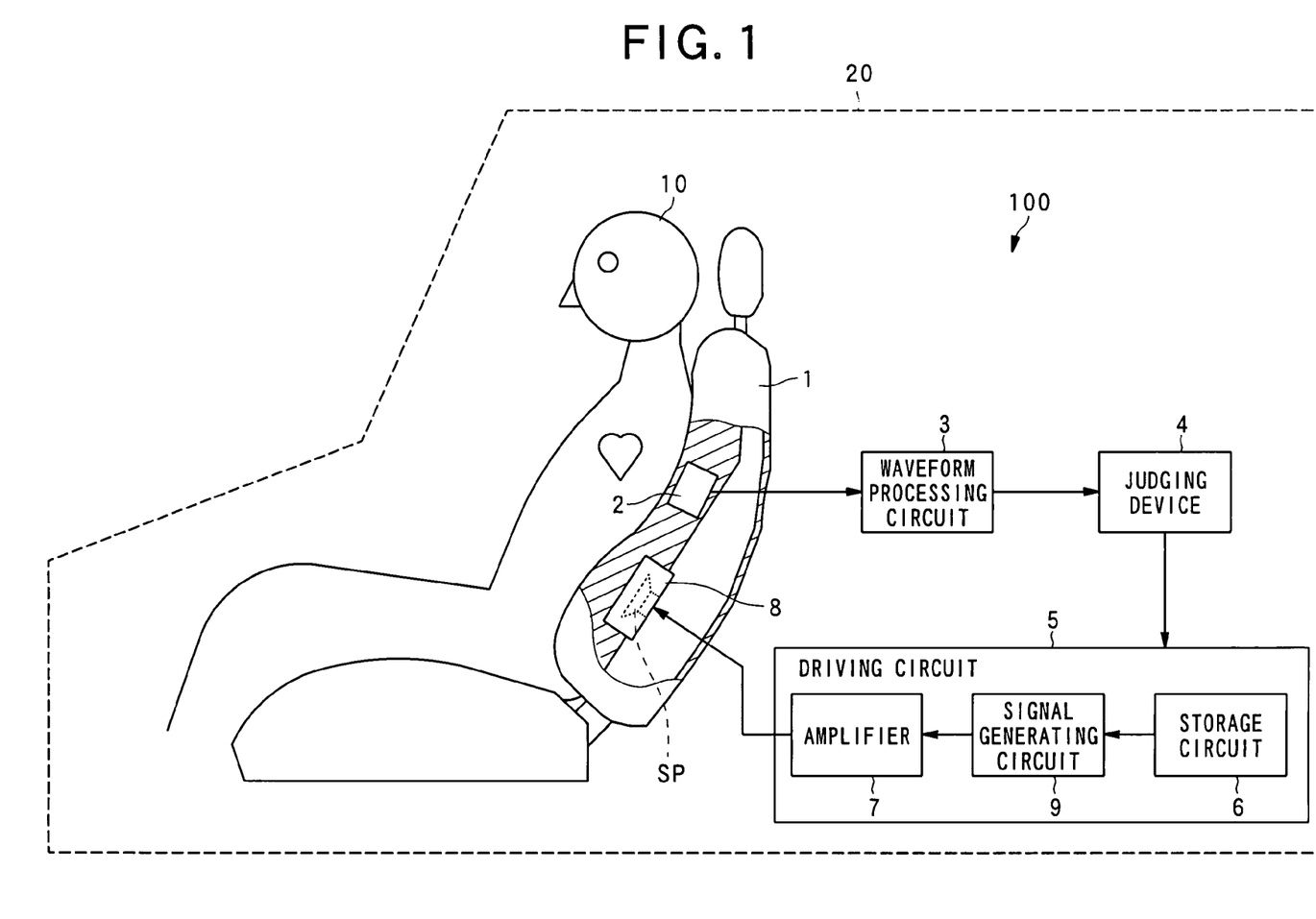
[FIG. 1] is a block diagram showing the functional construction of an abnormality reporting device for a vehicle.

FIG. 1 is a block diagram showing an abnormality reporting device 100 for a vehicle according to an embodiment.

The vehicle abnormality reporting device 100 is an abnormality reporting device which is mounted in a vehicle or the like and reports to a driver 10 when various abnormalities occurring in the driver 10 are detected. The vehicle abnormality reporting device 100 is equipped with a heartbeat sensor (detector) 2, a waveform processing circuit 3, a judging device (judging unit) 4, a driving circuit 5, and a vibrating device (vibrating unit) 8. The following description will be made in a case where the driver 10 falls into a nap state.

The heartbeat sensor 2 and the vibrating device 8 are mounted in a driver's seat (seat) 1 in which the driver sits. The heartbeat sensor 2 is mounted at a site near to the heart of the driver 10, and the vibrating device 8 is mounted at a site near to the back of the driver 10.

The heartbeat sensor 2 is a sensor for detecting the heartbeat of the driver 10, and outputs the heartbeat detected from the driver 10 as a heartbeat signal to the waveform processing circuit 3.

The waveform processing circuit 3 executes signal processing on the heartbeat signal obtained from the heartbeat sensor 2 to remove a signal noise contained in the heartbeat signal, and then outputs the processing result to the judging device 4.

The judging device 4 compares the heart rate based on the heartbeat signal obtained from the waveform processing circuit 3 with a predetermined threshold value, and judges whether the driver 10 is under the nap state. When judging that the driver 10 is under the nap state, the judging device 4 outputs a control signal for driving the vibrating device 8 to the driving circuit 5.

The driving circuit 5 drives the vibrating device 8 at a pulse period. The driving circuit 5 is equipped with a storage circuit 6, a signal generating circuit 9 and an amplifier 7. A signal waveform having a wakening effect as a wakening signal is stored in the storage circuit 6 in advance. Furthermore, the amplifier 7 is an amplifier for amplifying the wakening (perceiving) signal. The driving circuit which receives the control for driving the vibrating device 8 from the judging device 4 outputs the wakening signal stored in the storage circuit 6 to the amplifier 7. Subsequently, the wakening signal is amplified by the amplifier 7 and then outputs the amplified signal to the vibrating device 8.

The vibrating device is a device for converting an electrical signal to vibration, and it is equipped with a speaker SP, for example. The vibrating device 8 faithfully reproduces the signal waveform from the driving circuit 5, and transmits the signal waveform as vibration for promoting wakening to the driver 10.

Figure 2:
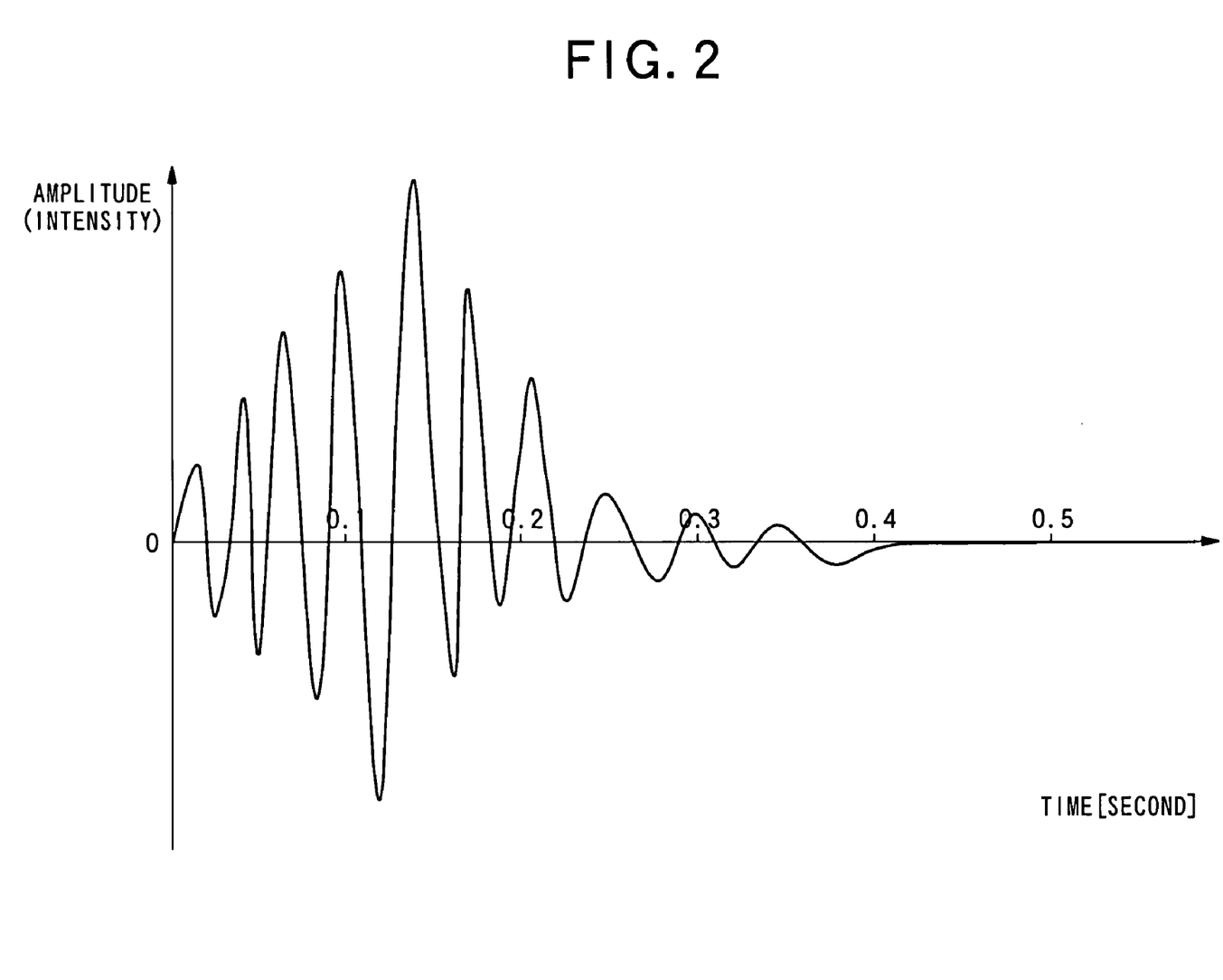
[FIG. 2] is a diagram showing the waveform of a one-shot perceiving signal.

FIG. 2 is a diagram showing the waveform of a one-shot wakening signal which is stored in the storage circuit 6. In FIG. 2, the ordinate axis represents the amplitude, and the abscissa axis represents the time (second). This basic frequency of this waveform is equal to 35 Hz because the number of waves at 100 msec is equal to about 3.5 waves. In this waveform, the vibration is generated with changing the amplitude and the frequency, and in the envelop curve of this waveform, a peak value is obtained at about 140 msec. Then, this waveform is rapidly attenuated after it reaches the peak value, and the amplitude is equal to substantially 0 (zero) before and after 400 msec. The vibrating device 8 faithfully reproduces such as a one-shot waveform as vibration, whereby a wakening effect which is similarly obtained in such a case that the back of a person is instantaneously pushed to awake the person can be applied to the driver 10.

Figure 3:
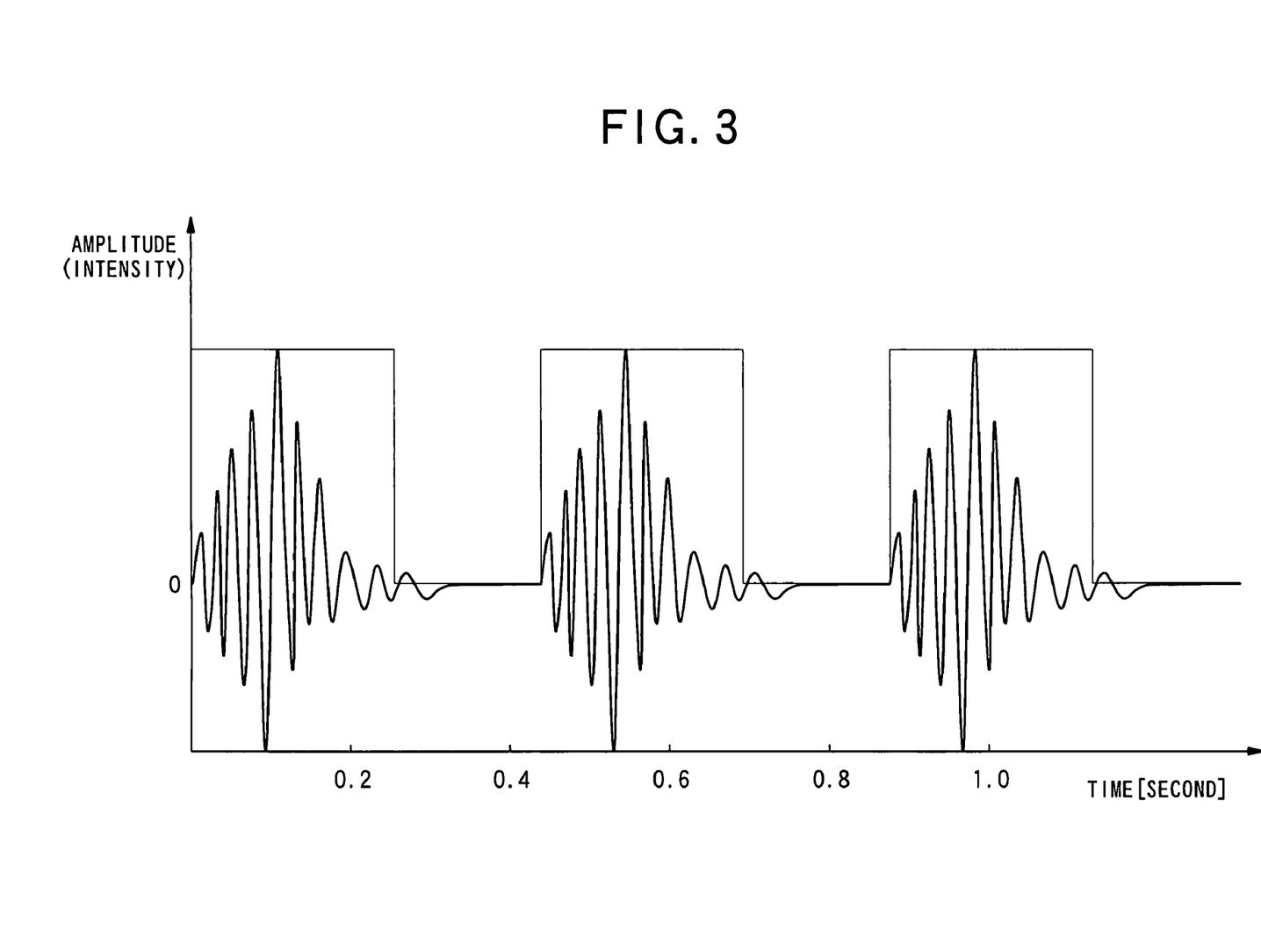
[FIG. 3] is a diagram showing the waveform of an intermittent perceiving signal.

FIG. 3 is a diagram showing the waveform of an intermittent wakening signal stored in the storage circuit 6.

The waveform shown in FIG. 3 comprises three intermittent input waveforms, and each of the waveforms concerned is the same as the one-shot input waveform described above. However, after the amplitude reaches the peak at about 100 msec, the amplitude is attenuated to substantially 0 (zero) at about 300 msec. This waveform has an interval slightly smaller than 200 msec after the amplitude is attenuated to substantially 0. This waveform has the same input waveform as the first one-shot waveform after the interval, and it is attenuated at about 300 msec from the time when the second one-shot waveform is started. The third one-shot waveform is similar, and it has an interval slightly smaller than 200 msec from the second one-shot waveform. This third waveform has the same waveform as the first and second one-shot waveforms after the interval, and it is attenuated at about 300 msec from the start time of the third one-shot waveform.

The intermittent input waveform as described above is output to the vibrating device 8 by the driving circuit 5, whereby the vibrating device 8 can apply to the driver 10 such an effect that the driver 10 has a mellow resonance as if the driver 10 hears intermittent drumbeats at the drum side.

Furthermore, as another application example of the intermittent input waveform as described above, vibration which would occur when a vehicle 20 steps on cat's-eyes (projections indicating the range of a driving lane) on a road during driving may be generated and applied to the driver 10, thereby awakening the driver 10.

FIG. 4 is a diagram showing the driving pattern based on the vibrating device 8 when the amplitude and driving interval of the vibration are intermittently varied.

FIG. 4 shows a vibration pattern generated by the vibrating device 8 from the judgment that the driver 10 is under the nap state (the nap detection is ON) till until the judgment that the driver 10 is not under the nap state. As shown in FIG. 3, the rectangular shape schematically shows a lump of input waveform pattern, and the waveforms shown in FIG. 3 are illustrated as rectangular waveforms in FIG. 4(a).

Figure 4A:
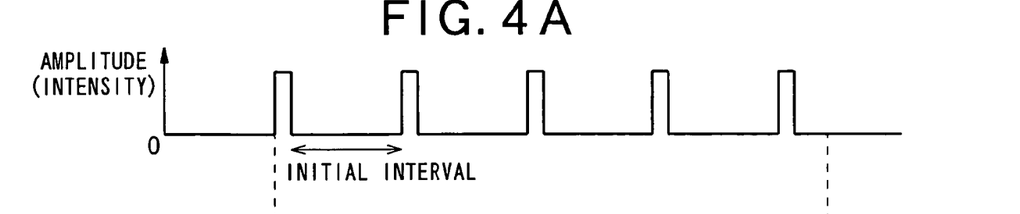
[FIG. 4] is a diagram showing a driving pattern of a vibrating device.

FIG. 4(a) shows a driving pattern when the driving circuit 5 drives the vibrating device 8 with the same vibration intensity and at the same driving interval as the initial interval. The driving circuit 5 repetitively drives the vibrating device 8 so that the vibrating device 8 intermittently vibrates until the judging device 4 judges that the judging device 4 is not under the nap state.

Figure 4B:
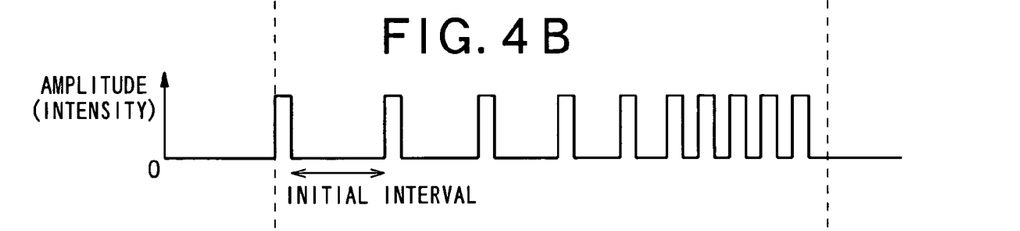

FIG. 4(b) shows a driving pattern when the driving circuit 5 drives the vibrating device 8 with the same vibration intensity while the driving interval is gradually shortened from the initial interval. In this driving pattern, the driving interval is gradually shortened until a predetermined time elapses. When the predetermined time elapses and the driving interval is set to be substantially equal to the length of one input wavelength, the driving circuit 5 repeats the driving of the vibrating device 8 until the judging device 4 judges that the driver 10 is not under the nap state.

Figure 4C:
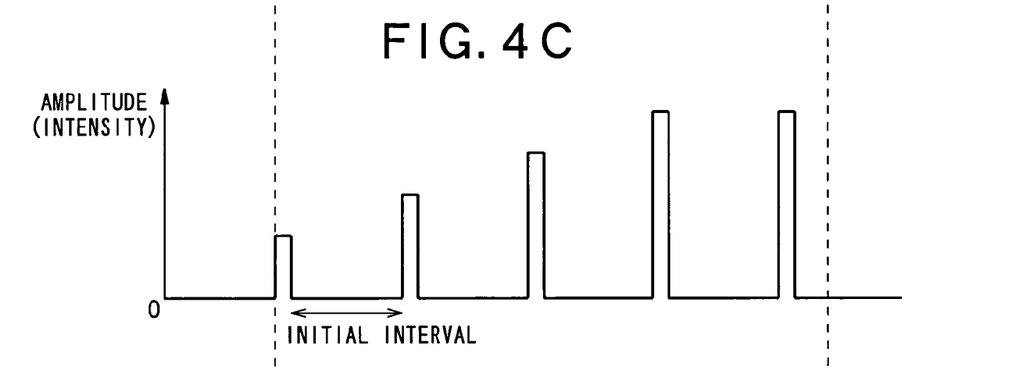
Figure 4D:
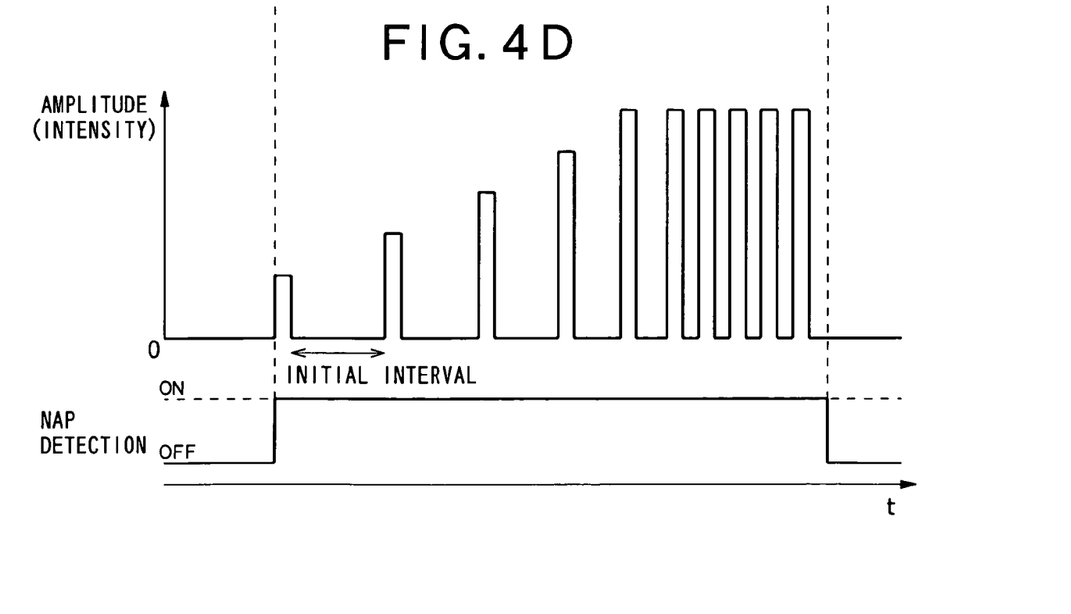

FIG. 4(c) shows a driving pattern when the driving circuit 5 drives the vibrating device 8 while the vibration intensity is gradually increased and the driving interval is set to the same interval as the initial interval. In this driving pattern, the vibration intensity is gradually increased until a predetermined time elapses. When the predetermined time elapses, the driving circuit 5 drives the vibration device 8 with a constant vibration intensity, and repeats the driving of the vibrating device 8 until the judging device 4 judges that the driver 10 is not under the nap state.

FIG. 4(*d*) shows a driving pattern when the driving circuit 5 drives the vibrating device 8 while the vibration intensity is gradually increased and the driving interval is gradually shortened from the initial interval. In this driving pattern, the vibration intensity is gradually increased and the driving interval is shortened until a predetermined time elapses. When this predetermined time elapses, the driving circuit 5 repeats the driving of the vibrating device 8 with the constant vibration intensity and substantially at the same interval as the length of one input waveform until the judging device 4 judges that the driver 10 is not under the nap state.

Furthermore, a combination of a one-shot vibration and an intermittent vibration may be used as the driving pattern. For example, when the driver 10 is not awaken by one one-shot signal, an intermittent signal is generated subsequently to the one-shot signal may be generated, whereby the awakening effect can be enhanced.

Figure 5:
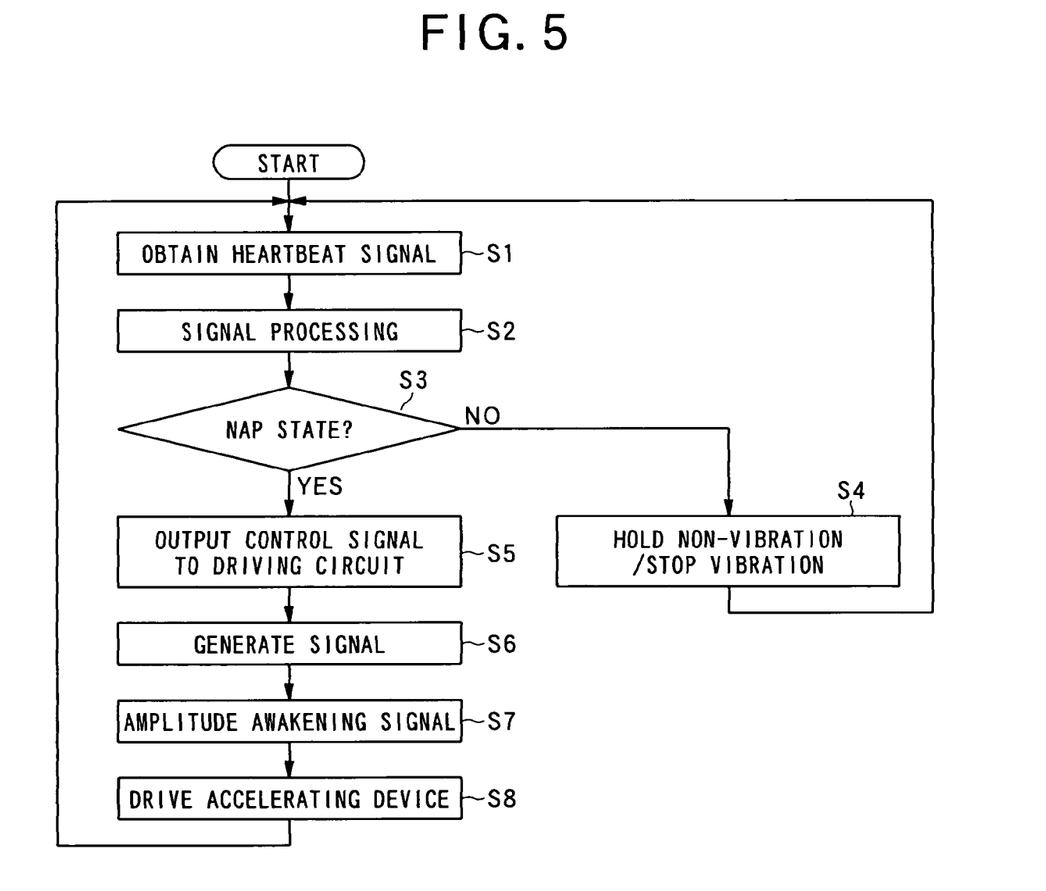
[FIG. 5] is a diagram showing the operation of the vehicle abnormality reporting device.

FIG. 5 is a flowchart showing the operation for promoting to awake the driver 10 by the vehicle abnormality reporting device 100.

When the vehicle abnormality reporting device 100 operates, the heartbeat of the driver 10 is first detected by the heartbeat sensor 2, and output as a heartbeat signal to the waveform processing circuit 3 (step S1).

Subsequently, the waveform processing circuit 3 executes the signal processing on the heartbeat signal obtained from the heartbeat sensor 2, and outputs to the judging device 4 the heartbeat signal from which a signal noise contained in the heartbeat signal is removed (step S2).

When obtaining the heartbeat signal from the waveform processing circuit 3, the judging device 4 judges on the basis of the obtained heartbeat signal whether the driver 10 is under the nap state (step S3).

If it is judged in step S3 that the driver 10 is not under the nap state (step S3: NO), the vehicle abnormality reporting device 100 keeps a non-vibration state when the vibrating device 8 does not vibrate or stops the vibration of the vibrating device 8 when the vibrating device 8 vibrates (step S4). Thereafter, the vehicle abnormality reporting device 100 repeats the series of processing from the processing of step S1.

On the other hand, if the judging device 4 judges in step S3 that the driver 10 is under the nap state (step S3: YES), the judging device 4 outputs a control signal to the driving circuit (step S5).

Subsequently, the driving circuit 5 reads out the signal waveform data stored in the storage circuit 6, and the signal generating circuit 9 converts the read-out signal waveform data to an awakening signal (step S6).

Then, the driving circuit 5 amplifies the awakening signal generated by the signal generating circuit 9 by the amplifier 7 (step S7).

The driving circuit outputs the amplified awakening signal to the vibrating device 8, and the vibrating device 8 starts driving on the basis of the awakening signal (step S8).

When finishing the processing until the step S8, the vehicle abnormality reporting device 100 returns to the processing of the step S1, and repeats the series of processing. If it is judged in step S3 that the driver 10 is not under the nap state (step S3:

NO), the driving circuit stops the vibration of the vibrating device 8 (step S4), and repeats the series of processing from the processing of the step S1.

According to this embodiment, the vibrating device 8 is driven to apply vibration to the driver 10 while varying the vibration pattern. Therefore, even when the driver is in the vibrating vehicle during running, vibration which is easily perceived by the driver can be generated and thus abnormality can be surely reported to the driver.

Furthermore, the vibration applied to the driver 10 by the vibrating device 8 is a one-shot or intermittent vibration. Therefore, as compared with a case where continuous vibration is applied, the driver 10 can be promoted to be awaken with no pain, no itch sensation and no discomfort.

Still furthermore, if vibration which would occur when the vehicle 20 steps on an on-road installation such as a cat's-eye during running is imitated and applied to the driver 10 to perceive the driver 10, voice which would occur when the driver 10 is reported with a sound alarm is not output, and thus the driver does not feel botheration.

The present invention has been described above on the basis of the embodiment, however, the present invention is not limited to this embodiment. In the above construction, the heartbeat of the driver 10 is detected by the heartbeat sensor 2 to judge whether abnormality occurs in the driver 10. However, the present invention is not limited to this mode. For example, abnormality occurring in the driver 10 may be judged according to a method of measuring variation of the steering operation of the driver 10 or a method of measuring opening/closing of the eyes of the driver 10.

Figure 7:
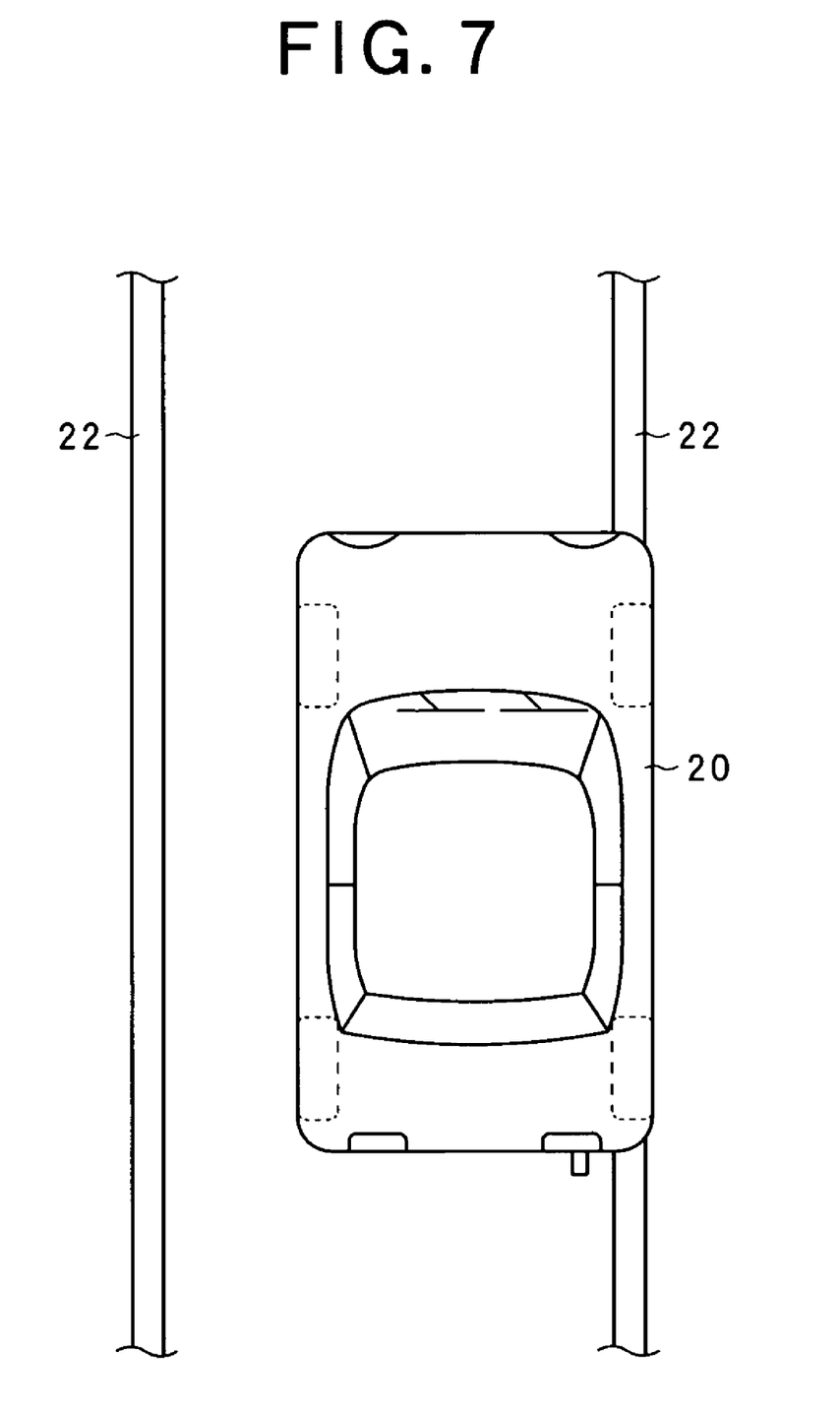
[FIG. 7] is a diagram showing a white-line deviated state of a vehicle.

In the above embodiment, the heartbeat sensor 2 and the waveform processing circuit 3 are provided, and abnormality occurring in the driver 10 is detected. However, the present invention is not limited to this mode. For example, a CCD camera, an image processing device for the CCD camera and a steering sensor for detecting the driver's steering operation may be provided so that the white-line deviation state of the vehicle 20 is detected in place of abnormality occurring in the driver 10 or in addition to abnormality occurring in the driver 10. In this case, when the judging device judges that the vehicle 20 approaches to a white line 22 indicating the range of the driving lane to the extent that it gets out of the driving lane, the vibrating device applies to the driver 10 the vibration imitating the vibration when the vehicle 20 steps on cat's-eyes. Accordingly, the driver reflexively feels his/her steering error, and thus the driver can quickly correct the steering operation.

Figure 6:
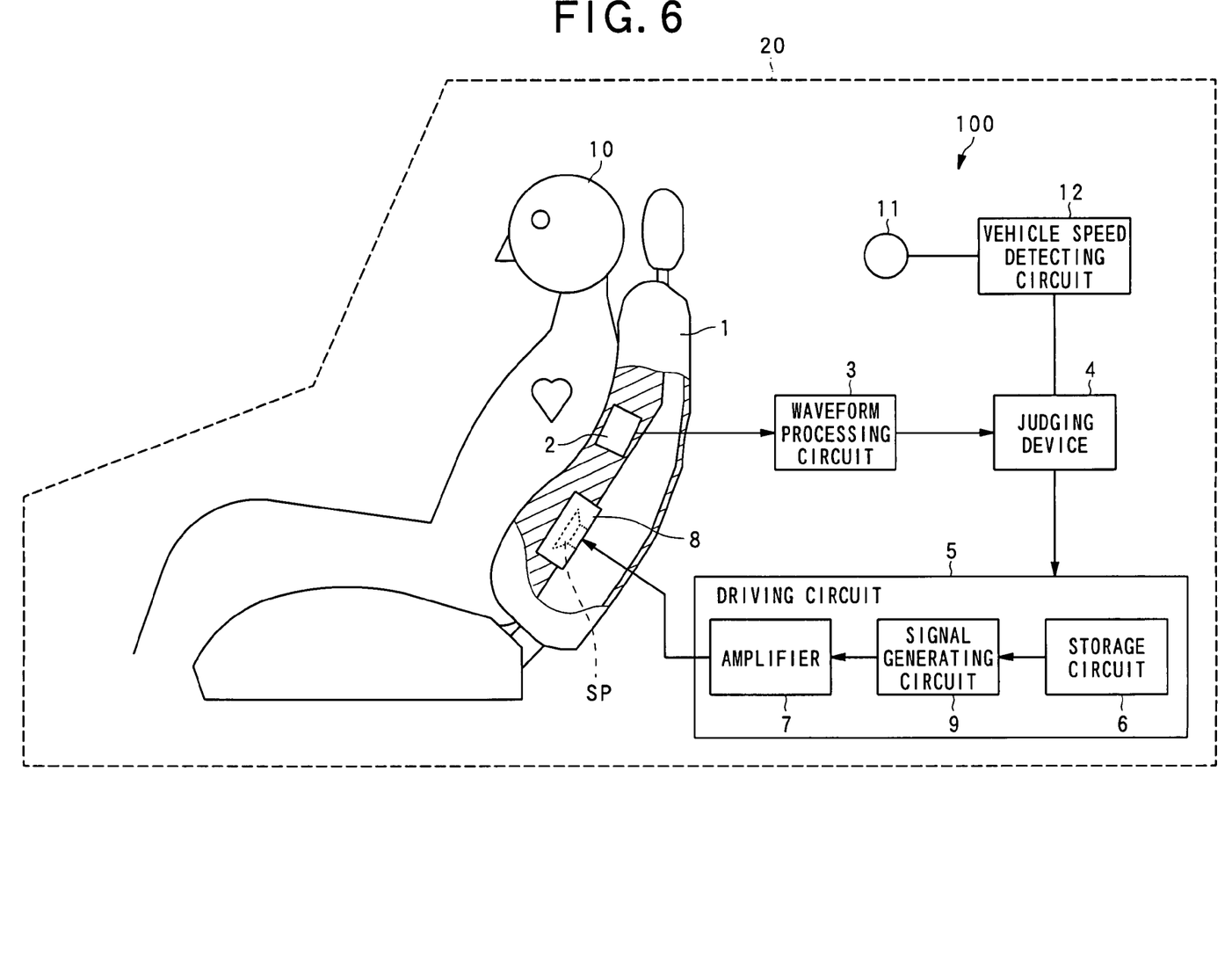
[FIG. 6] is a block diagram showing the functional construction of a vehicle abnormality reporting device according to a modification.

In the above embodiment, the vibrating device is driven on the basis of only the heartbeat detected from the driver 10 out of consideration of the speed of the vehicle 20. However, the present invention is not limited to this mode. For example, the above embodiment may be provided with a vehicle speed sensor (vehicle detector) 11 for detecting the speed of the vehicle 20 and outputting the detected speed of the vehicle 20 as a vehicle speed signal, and a vehicle speed detecting circuit 12 for obtaining the vehicle speed signal output from the vehicle speed sensor 11, executing the signal processing on the obtained vehicle speed signal to remove a signal noise contained in the vehicle speed signal, and outputting the processed vehicle speed signal to the judging device 4, and the driving circuit 5 may control the vibrating device 8 in accordance with the detected speed. In this case, the initial driving interval at the driving start time of the vibrating device 8 may be set to a long value when the speed is low and set to a short value when the speed is high. At this time, the driving circuit 5 may gradually shorten the vibration interval with respect to the initial driving interval set in accordance with the speed. Furthermore, the initial vibration intensity may be set in accordance with the speed of the vehicle 20. For example, the vibration intensity may be set so that it is weak when the speed is low and strong when the speed is high. As described above, if the vibrating device 8 is controlled in accordance with the detected speed of the vehicle 20, vibration which is stressful and can be easily perceived by the driver can be generated and abnormality can be surely reported to the driver.

Furthermore, the CCD camera and the image processing device therefore as described above may be provided in addition to the construction of controlling the vibrating device 8 in accordance with the detected speed of the vehicle 20, and the white-line deviation state of the vehicle 20 may be detected in place of abnormality occurring in the driver 10 or in addition to abnormality occurring in the driver 10. When the judging device 4 judges that the vehicle 20 approaches to the white line 22 to the extent that the vehicle 20 gets out of the driving lane, the vibrating device 8 may apply to the driver the vibration having one of vibration patterns as shown in FIGS. 4(*a*) to (*d*) or the vibration imitating the vibration when the vehicle steps on cat's-eyes while the vibration concerned is varied in accordance with the speed. According to this construction, the vibration is varied in accordance with the speed, and thus the stressful vibration which can be easily perceived by the driver can be generated. Here, when the white-line deviation state is continued as shown in FIG. 7, although the predetermined time elapses, the vibration interval is gradually shortened or the vibration intensity is gradually increased as shown in FIGS. 4(*b*) to (*d*), whereby vibration which is further stressful and can be more easily perceived by the driver can be generated even when the vehicle 20 runs at a constant speed, and thus abnormality can be more surely reported to the driver.

The invention claimed is:

1. An abnormality reporting device for a vehicle, comprising:
    a detector configured to detect the state of a driver or the running state of a vehicle while the vehicle is running;
    a judging unit configured to judge on the basis of a detection result of the detector whether the state of the driver or the state of the vehicle is under an abnormal state; and
    a vibrating unit configured to apply vibration having a predetermined vibration pattern to the driver when the abnormal state is judged,
    wherein the vibrating unit is configured to apply the vibration while varying the vibration pattern when the abnormal state is continued,
    wherein the vibrating unit is configured to apply a vibration on the basis of a plurality of pulses while varying a vibration pattern of the vibration when the abnormal state is continued,
    wherein each of the plurality of pulses comprises a pulse wave, and
    wherein the vibrating unit configured to apply the vibration while continuously varying the frequency and amplitude of each pulse wave during a period when each pulse occurs.

2. The vehicle abnormality reporting device according to claim 1, wherein the vibrating unit continuously varies the frequency of the vibration when the vibration pattern is varied.

3. The vehicle abnormality reporting device according to claim 1, wherein the vibrating unit continuously or stepwise varies the amplitude of the vibration when the vibration pattern is varied.

4. The vehicle abnormality reporting device according to claim 1, wherein the vibrating unit varies the vibration applying interval when the vibration pattern is varied.

5. The vehicle abnormality reporting device according to claim 1, wherein the vibration obtained by the vibration pattern is a one-shot vibration.

6. The vehicle abnormality reporting device according to claim 1, wherein the judging unit judges the abnormal state when the detection result of the detector indicates that the driver is under a nap state.

7. The vehicle abnormality reporting device according to claim 1, wherein the judging unit judges the abnormal state when the detection result of the detector indicates that the vehicle deviates from a white line.

8. The vehicle abnormality reporting device according to claim 1, wherein the vibrating unit is disposed at a seat in which the driver sits.

9. The vehicle abnormality reporting device according to claim 1, wherein the vibrating unit is equipped with a speaker for converting an electrical signal to the vibration.

10. The vehicle abnormality reporting device according to claim 1, further comprising a vehicle speed detector for detecting the speed of the vehicle, wherein the vibrating unit varies the vibration pattern in accordance with the detected speed.

11. The vehicle abnormality reporting device according to claim 10, wherein when the vibration pattern is varied, the vibrating unit lengthens an initial driving interval if the detected speed is low, and shortens the initial driving interval if the detected speed is high.

12. The vehicle abnormality reporting device according to claim 10, wherein the vibrating unit varies initial vibration intensity in accordance with the detected speed when the vibration pattern is varied.

13. The vehicle abnormality reporting device according to claim 1, wherein the frequency and amplitude of each pulse wave are continuously varied every pulse wave.

* * * * *